May 22, 1962  A. ARNHEITER  3,035,689
KIT FOR FORMING FIGURES, IN PARTICULAR ANIMALS
Filed Sept. 9, 1959
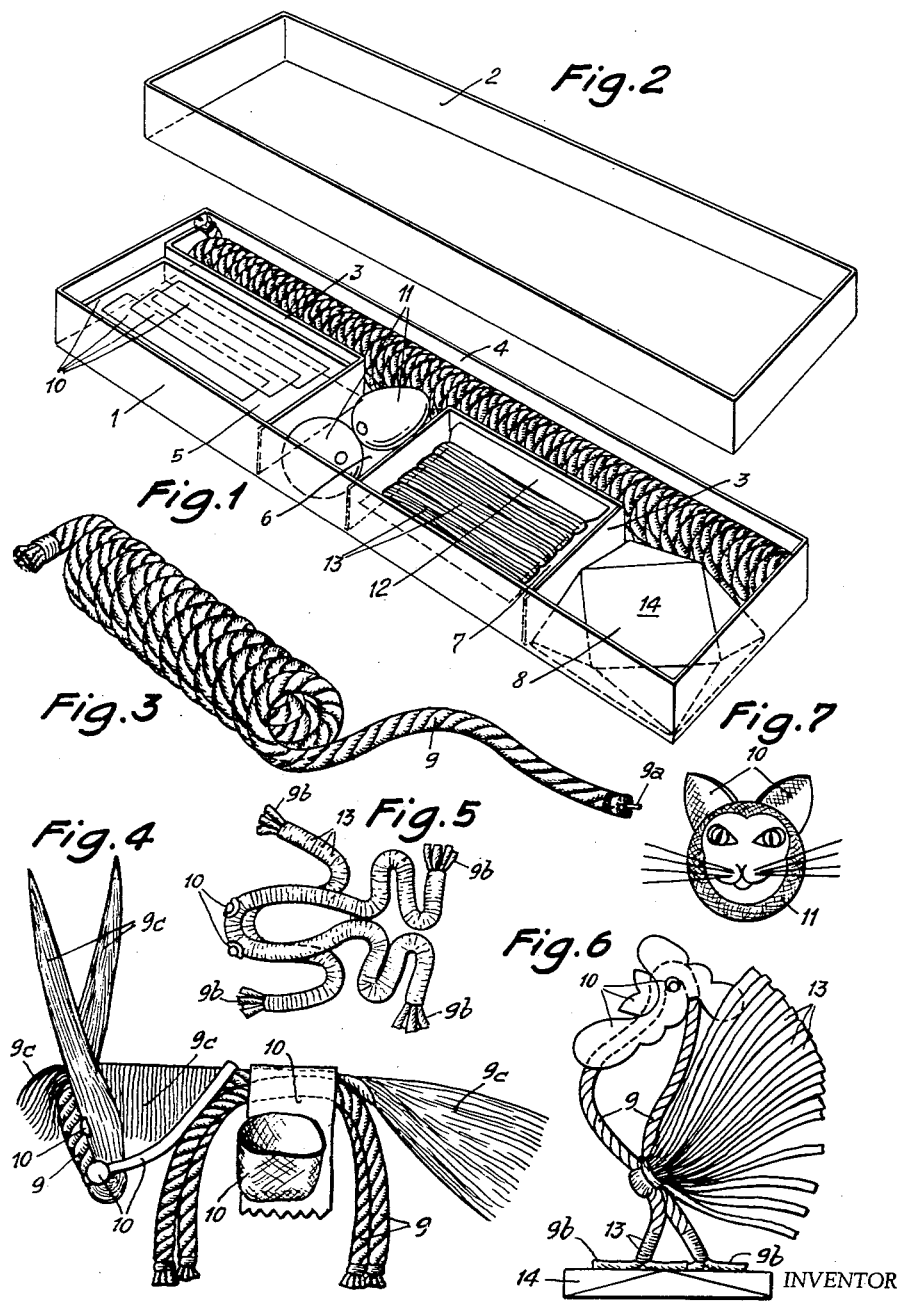
INVENTOR
ADOLF ARNHEITER
BY Lowry & Rinehart
ATTORNEYS United States Patent Office 3,035,689
Patented May 22, 1962

3,035,689
KIT FOR FORMING FIGURES, IN PARTICULAR ANIMALS
Adolf Arnheiter, St. Gallen, Switzerland
Filed Sept. 9, 1959, Ser. No. 838,937
5 Claims. (Cl. 206—47)

My present invention relates to improvements in kits for forming figures, in particular animals. In this kit are contained a plurality of different constructional elements in a lidded cardboard box in suitable compartments separated from each other by partitions, in a clear and neat arrangement suitable for display; essential constructional elements comprising a cord, pieces of cloth, binding parts as well as head bodies and at least one figure pedestal.

A particularly pleasing form for the make-up of the cord is attained by inserting same as a spirally wound body in an elongated compartment of the cardboard box.

One form of the invention is shown, by way of example, in the drawing, in which—

FIG. 1 shows the kit in its box, with its cover removed,
FIG. 2 shows the cover,
FIG. 3 depicts the coiled cord, and
FIGS. 4 to 7 illustrate a few examples of animal figures formed of elements of the kit.

In an elongated, flat cardboard box 1 with cover 2, suitable compartments 4 to 8 are formed by partitions 3 for accommodating the constructional elements. The elongated compartment 4 serves for taking-up a coiled sisal cord 9 provided with a soft-metal wire cord 9a. The compartment 5 serves for the accommodation of various colored felt pieces 10 which are clearly and neatly arranged with respect to their different colors. In compartment 6 are housed animal head bodies 11 made of cork or hard foam plastic in spherical or egg shape. Item 12 is a card-board spool on which are wound a plurality of bast strands 13 of different colors clearly arranged side by side. In compartment 8 is disposed a figure pedestal 14. In the box cover 2 is inserted a set of instructions (not shown) with drawings for assembling the animal figures, in which is clearly described the use of the constructional elements for the assembly of the various figures.

As shown by the animal figure illustrated in FIG. 4, it may be ascertained, by means of the reference signs, which constructional elements have been used for forming the various figure parts and portions. It is to be noted that for making the ears, tail and mane hairs of the figure characterising a donkey, the cord 9 is partly or wholly undone into its fibers 9c, the latter being bound with adhesive for forming the ears.

In the animal figure representing a frog as shown in FIG. 5, the entire body is formed of the cord 9 which is wound with green bast 13 down to the toes of the fore legs and hind legs. The toes are formed by partly undoing the cord 9 into single strings 9b and spreading the latter. The frog eyes are cut from black and white felt cloth and glued down on the figure bodies.

In FIG. 6 which represents a cock, the animal body is formed of the cord 9, and the tail feathers are formed from a varicolored tuft of bast of different colors, while the head is formed of differently colored felt-cloth pieces cut and assembled as described and shown in the instructions. The toes which are formed by spreading the cord strings 9b, are secured to the pedestal 14 by means of adhesive.

For further animal figures (not shown) such as dogs, cats, squirrels and so on, the head may be formed from the bodies 11 which include a corresponding bore for attachment to the animal neck. The head, as shown in FIG. 7, is painted and provided with the facial contours of the animal in question. The ears are cut from felt and glued down edgewise on the body 11.

Obviously the number and type of the constructional elements may be increased or enriched as desired, and also other animal figures may be formed. For example, cords of different thickness, further forms of animal bodies and further pedestals may be provided.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A kit for forming figures, in particular animal figures, comprising a box with a cover, partitions in said box defining compartments including one compartment extending the full length of said box along one side thereof and a series of other compartments disposed in a row alongside said one compartment, and a plurality of constructional elements disposed in said compartments in a clear and neat arrangement suitable for display, said constructional elements including an elongated coil of cord lying in said full length compartment and extending substantially the full length of said box and in full view, at least one figure pedestal seated in one of said other compartments in the normal figure receiving position thereof, head bodies seated in another of said other compartments in adjacent fully visible relation, cloth pieces neatly arranged in still another of said other compartments for viewing and removal, and a flat spool of binding parts laid flat in a further of said other compartments for full viewing thereof.

2. A kit for forming figures, in particular animal figures, comprising a cardboard box with cover and appropriate compartments separated by partitions, with one compartment extending the full length of the box at one side of the box and the other compartments arranged in aligned series, and a plurality of constructional elements disposed in said compartments in a clear and neat arrangement suitable for display, essential constructional elements including a cord in the full-length compartment, a plurality of cloth pieces, binding parts as well as head bodies and at least one figure pedestal in the aligned series of compartments, said cord being made of hemp and having a core of soft metal wire.

3. A kit for forming figures, in particular animal figures, comprising a box with a cover, partitions in said box defining compartments including one compartment extending the full length of said box along one side thereof and a series of other compartments disposed in a row alongside said one compartment, and a plurality of constructional elements disposed in said compartments in a clear and neat arrangement suitable for display, said constructional elements including an elongated coil of cord lying in said full length compartment and extending substantially the full length of said box and in full view, at least one figure pedestal seated in one of said other compartments in the normal figure receiving position thereof, head bodies seated in another of said other compartments in adjacent fully visible relation, cloth pieces neatly arranged in still another of said other compartments for viewing and removal, and a flat spool of binding parts laid flat in a further of said other compartments for full viewing thereof, said cloth pieces being differently colored and arranged in their respective compartment in accordance with their colors.

4. A kit for forming figures, in particular animal figures, comprising a box with a cover, partitions in said box defining compartments including one compartment extending the full length of said box along one side thereof and a series of other compartments disposed in a row alongside said one compartment, and a plurality of constructional elements disposed in said compartments in a clear and neat arrangement suitable for display, said constructional elements including an elongated coil of cord lying in said full length compartment and extending substantially the full length of said box and in full view, at least one figure pedestal seated in one of said other compartments in the normal figure receiving position thereof, head bodies seated in another of said other compartments in adjacent fully visible relation, cloth pieces neatly arranged in still another of said other compartments for viewing and removal, and a flat spool of binding parts laid flat in a further of said other compartments for full viewing thereof, said bonding parts being in the form of colored bast strands separately wound on said spool.

5. A kit for forming figures, in particular animal figures, comprising a box with a cover, partitions in said box defining compartments including one compartment extending the full length of said box along one side thereof and a series of other compartments disposed in a row alongside said one compartment, and a plurality of constructional elements disposed in said compartments in a clear and neat arrangement suitable for display, said constructional elements including an elongated coil of cord lying in said full length compartment and extending substantially the full length of said box and in full view, at least one figure pedestal seated in one of said other compartments in the normal figure receiving position thereof, head bodies seated in another of said other compartments in adjacent fully visible relation, cloth pieces neatly arranged in still another of said other compartments for viewing and removal, and a flat spool of binding parts laid flat in a further of said other compartments for full viewing thereof, said head bodies being representative of heads of animals.

References Cited in the file of this patent

UNITED STATES PATENTS

| | | |
|---|---|---|
| 1,255,446 | Lofgren | Feb. 5, 1918 |
| 1,460,700 | Buffington | July 3, 1923 |
| 1,590,898 | McAuley | June 29, 1926 |
| 1,925,895 | Biber | Sept. 5, 1933 |
| 2,019,516 | Weinberg | Nov. 5, 1935 |